United States Patent [19]

Pease

[11] Patent Number: 5,537,730
[45] Date of Patent: Jul. 23, 1996

[54] COIL INSERTING TOOLING BLADES

[75] Inventor: Timothy K. Pease, Kendallville, Ind.

[73] Assignee: RMT, Inc., Huntertown, Ind.

[21] Appl. No.: 262,031

[22] Filed: Jun. 17, 1994

[51] Int. Cl.⁶ ........................................ H02K 15/06
[52] U.S. Cl. .............................. 29/596; 29/734; 29/736
[58] Field of Search .................... 29/596, 598, 732, 29/734, 736

[56] References Cited

U.S. PATENT DOCUMENTS 4,067,106  1/1978  Brown et al. ............................ 29/734
5,357,670  10/1994  Taji et al. ............................... 29/736 X Primary Examiner—Carl E. Hall
Attorney, Agent, or Firm—Roger M. Rickert

[57] ABSTRACT

Improvements in coil placing tooling of the type employed to insert prewound coils in the slots of dynamoelectric machine stator cores. Certain ones of the blades comprise an elongated blade of generally uniform cross-sectional configuration which includes a convex portion having a series of: generally parallel grooves cut therein to define intervening coil contacting lands. As compared to conventional "smooth" blades, these blades have only a portion of the area of contact with the coils and, therefor, only a fraction of the frictional resistance to coil insertion.

6 Claims, 3 Drawing Sheets

COIL INSERTING TOOLING BLADES

SUMMARY OF THE INVENTION

The present invention relates generally to apparatus for inserting prewound coils into the slots of dynamoelectric machine stator cores and more particularly to improvements in such apparatus which reduce the friction encountered during such insertion thereby reducing the likelihood of wire damage during the insertion process.

U.S. Pat. No. 2,432,267 to Adamson teaches a slotted cylinder to which fits within the bore of a slotted dynamoelectric machine stator core. Coils are placed in the cylinder slots and the cylinder is inserted into a stator core bore. A stripper moves through the cylinder forcing the coils into the stator slots. The apparatus shown in the Hill U.S. Pat. No. 3,324,536 refines this technique by utilizing a plurality of upstanding blades rather than an Adamson-type cylinder and by providing a set of upstanding wedge guides radially outside the set of blades, for guiding insulating wedges such as phase separating wedges or slot closure wedges from a cylindrical magazine into the stator cope along with the side turn portions of the coils. The Hill device recognizes that the frictional resistance to insertion is a problem and attempts to reduce that friction by coating the blades with a PTFE low friction polymer. The coil inserter of U.S. Pat. No. 3,689,976 to Donovan attempts to reduce the friction encountered and prevent certain wire sizes from jamming during placement by supporting some (typically alternate ones) of the inner set of blades on the stripper so that those blades move relative to tile remaining blades during the insertion process. Such alternately movable blades are referred to as "piggyback blades." Coil placing machines of this type, and particularly the tooling for such machines has undergone numerous other refinements since their introduction, but continue to be plagued by the problems associated with the frictional resistance to coil insertion.

Among the several objects of the present invention may be noted the provision of coil placing tooling which overcomes the drawbacks of the abovementioned patented devices; the provision of coil placing tooling which reduces the force required to insert wire into a stator core; the provision of coil placing tooling which is less likely to damage wire or insulation during coil placement; and the provision of coil placing tooling which reduces the range of locking wire sizes and, in some cases, eliminates the need for piggyback blades. These as well as other objects and advantageous features of the present invention will be in part apparent and in part pointed out hereinafter.

In general and in coil insertion tooling of the type having a plurality of elongated generally parallel upstanding blades disposed in a generally cylindrical pattern for receiving prewound coils and a slotted stator core, and for guiding the coils during insertion into selected stator core slots, the frictional force between the blades and the prewound coils is reduced by providing the blades surfaces with a plurality of elongated grooves and intervening coil contacting lands extending generally in the direction of blade elongation. This reduces the area of contact between the coils and blade surfaces and therefore also the frictional force therebetween.

Also in general and in one form of the invention, an improved blade for coil placing tooling in the form of an elongated member of generally uniform cross-sectional configuration has a convex portion with a plurality of intervening concave portions. The blade is normally utilized in coil placing tooling with the concave portions providing clearance spaces between the areas of contact between the blade and a corresponding coil.

BRIEF DESCRIPTION OF THE DRAWINGS

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
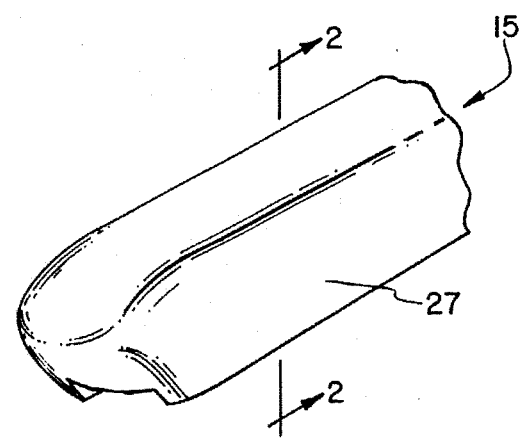
FIG. 1 is a perspective view of a portion of a prior art coil insertion tooling blade.
Figure 2:
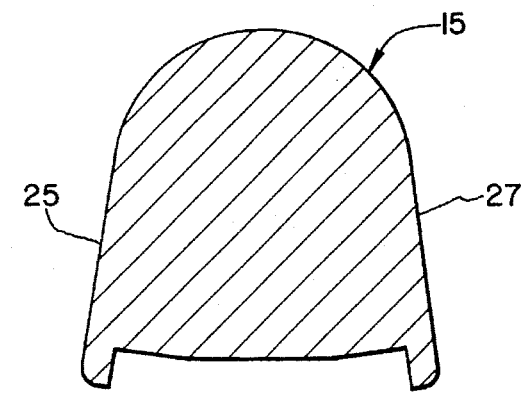
FIG. 2 is a cross-sectional view along lines 2—2 of FIG. 1.
Figure 3:
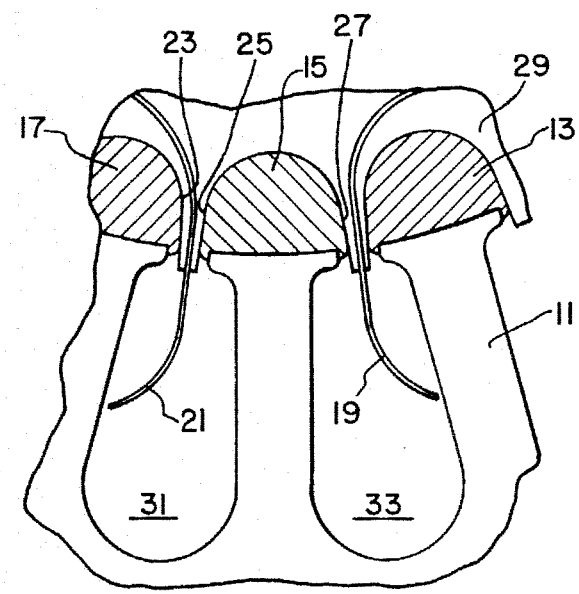
FIG. 3 is a partially cross-sectional view of a portion of coil insertion tooling and an associated dynamoelectric machine stator core in position thereon to receive wire.

Considering first FIGS. 1–3, coil placing tooling for inserting prewound coils such as 19 and 21 into slots of a dynamoelectric machine stator core 11 frequently has a plurality of elongated generally parallel upstanding blades such as 13, 15 and 17 disposed in a generally cylindrical pattern for receiving those coils such as 19 and 21 along with the stator core 11. The blades are elongated in the direction perpendicular to the plane of the paper. A stripper 29 then moves upwardly as viewed along the blades forcing the coils 19 and 21 into the slots such as 31 and 33 of the stator core 11. The surfaces of the blades such as the opposed facing surfaces 23, 25 and 27 which contact the wire are smooth, polished surfaces.

Figure 5:
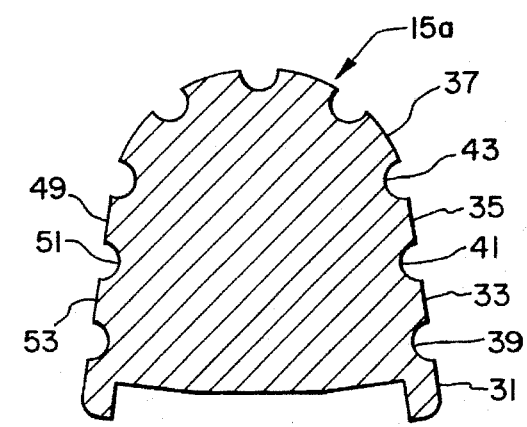
FIG. 5 is a cross-sectional view along lines 5—5 of FIG. 4.
Figure 4:
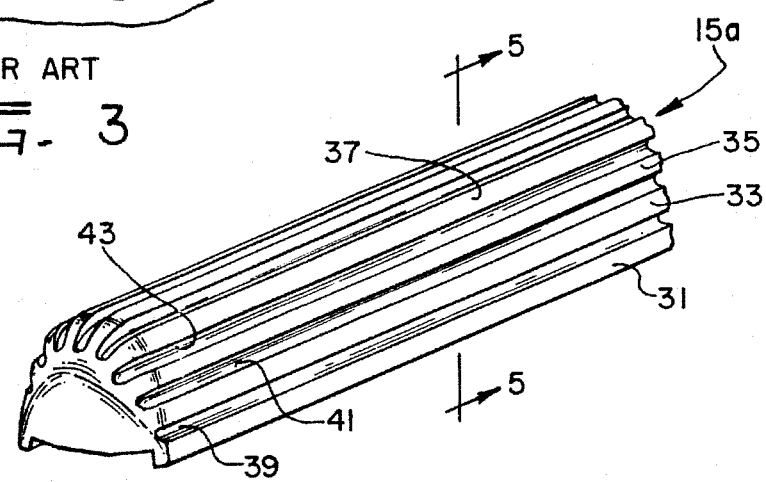
FIG. 4 is a perspective view of a portion of a coil insertion tooling blade incorporating the present invention in one form.
Figure 7:
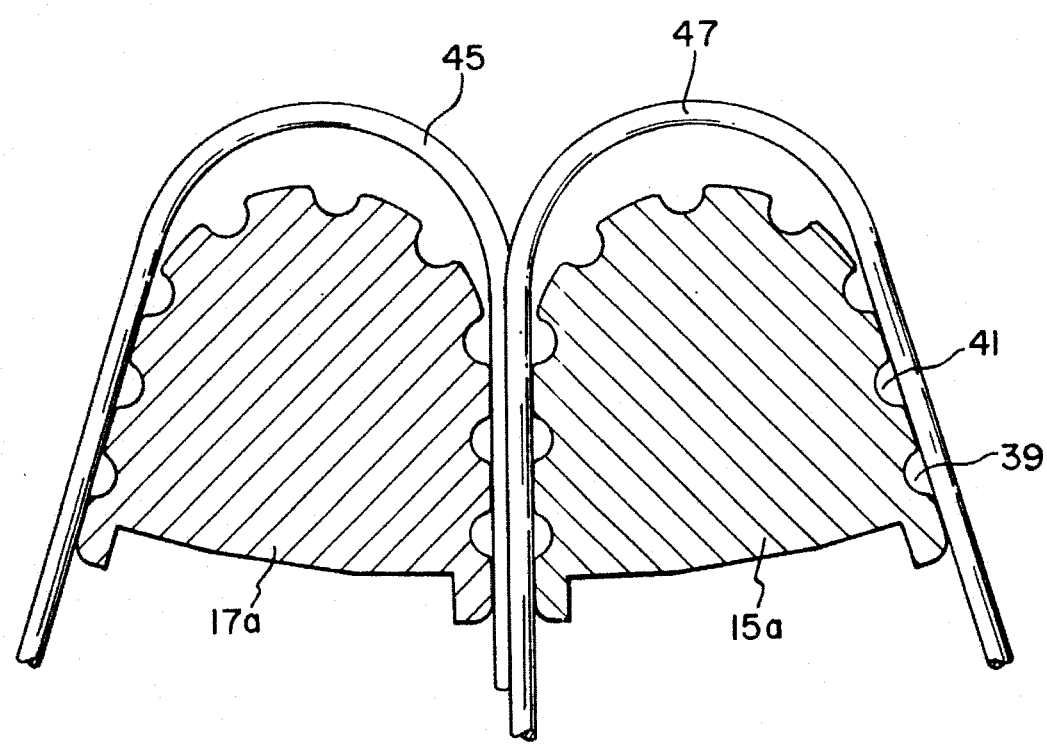
FIG. 7 is a cross-sectional view along lines 7—7 of FIG. 6, but with an adjacent blade shown.

In the present invention, blades such as 15a and 17a replace blades such as 15 and 17. An irregular blade surface is created in the region of contact between a blade and a corresponding prewound coil to reduce the area of contact between the blade and coil, and therefore also reduce the friction experienced by the coil during insertion into the core. FIGS. 4 and 5 show an improved blade according to the present invention. Blade 15a has such an irregular surface in the form of a fluted outer peripheral portion having a plurality of lands or ridges 31, 33, 35 and 37, and intervening grooves 39. The lands such as 33 and 35 and grooves such as 39 and 41 are generally parallel to one another and to the direction of blade elongation. In FIG. 5, the grooves are shown as they appear prior to a final polishing step whereas they are shown in FIG. 7 subsequent to that polishing step. This polishing step modifies the sharp edges so that the radii blend somewhat.

Figure 6:
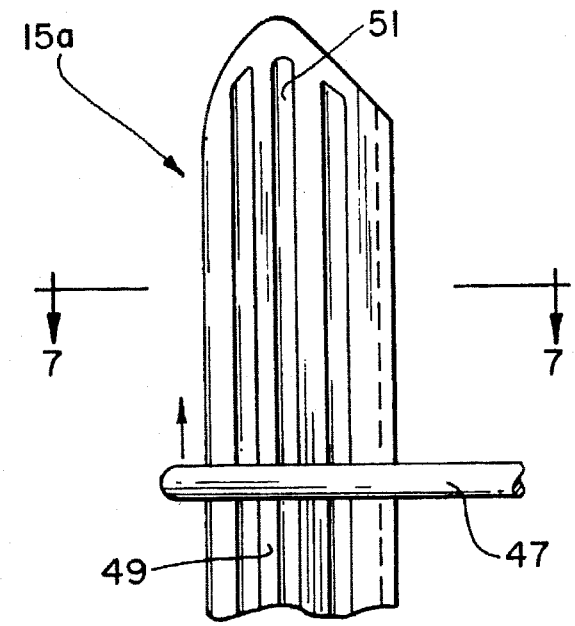
FIG. 6 is a side elevation view of the improved blade of FIGS. 4 and 5 and an associated wire turn during insertion.

FIG. 7 illustrates a pair of adjacent blades 15a and having opposed facing surfaces between which coil portions 45 and 47 move during the insertion process. To reduce the area of contact between the blade and coil, say, blade 15a and coil 47, the facing surface 53 (the surface visible in FIG. 6) is provided with a series of axially relieved regions of generally uniform cross-sectional configuration extending in the direction of blade elongation to form the alternating lands or ridges such as 49 and grooves or troughs such as 51 with the blade 15a contacting coil 47 only along the ridges such as 49.

Figure 8:
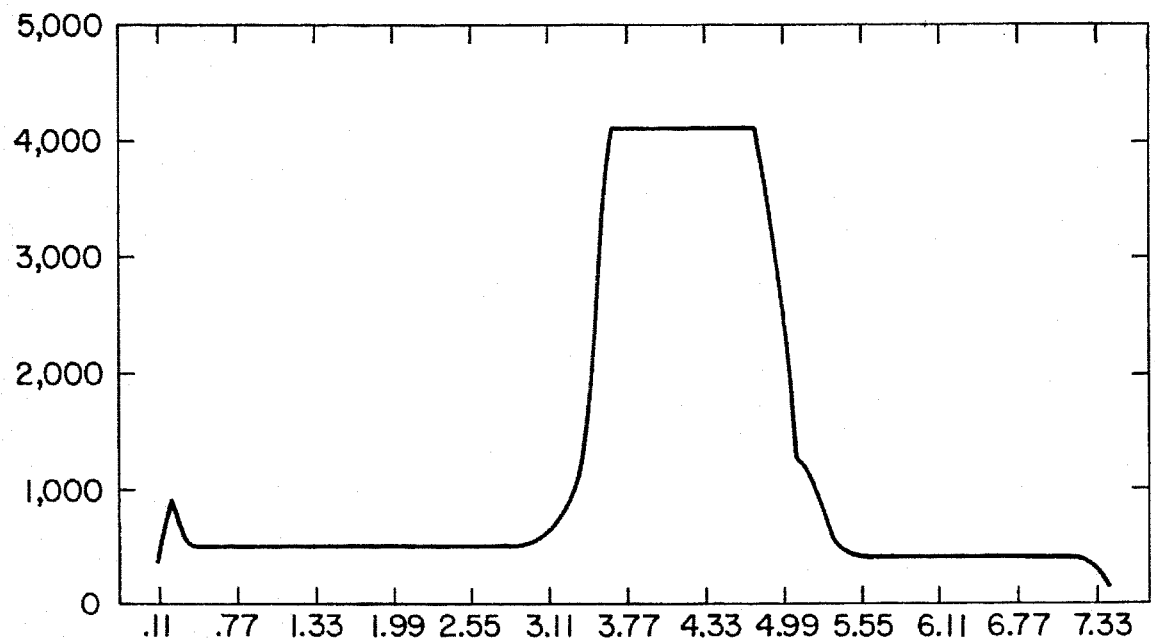
FIG. 8 shows a graph of insertion force as a function of stripper displacement utilizing conventional blades as shown in FIGS. 1 and 2.
Figure 9:
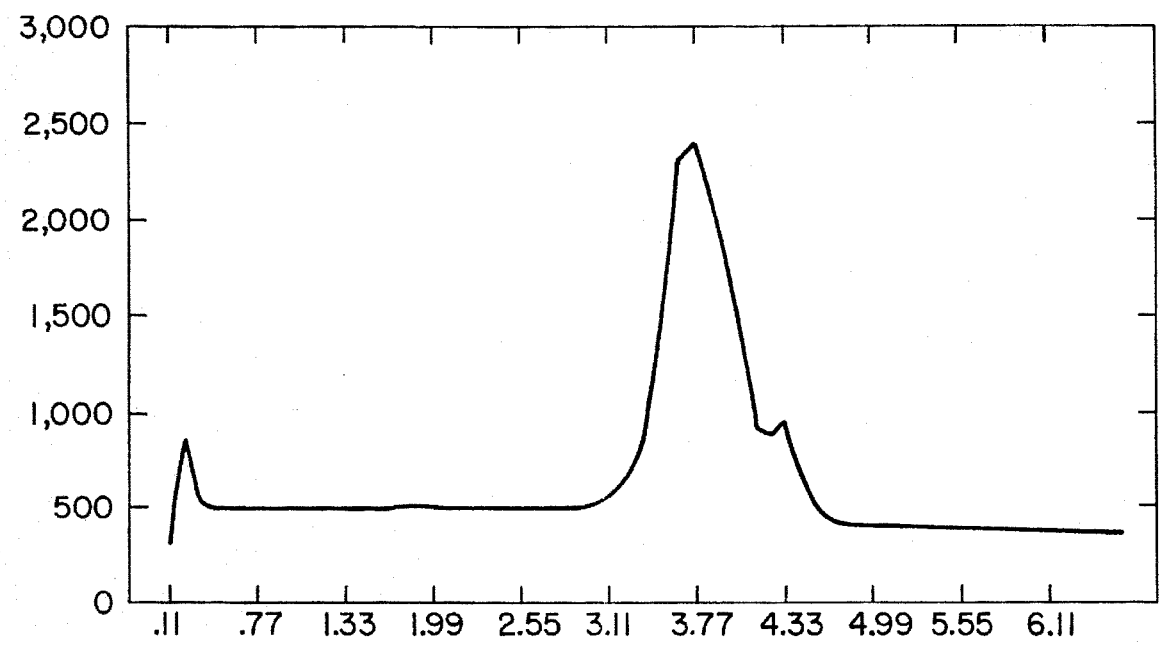
FIG. 9 shows a graph of insertion force as a function of stripper displacement utilizing the improved blades as shown in FIGS. 4–7.

Tests have shown that an inserting force reduction of about 45% can be achieved using the improved blade configuration of the present invention. FIGS. 8 and 9 show insertion force as a function of stripper displacement for an illustrative locking wire size. As shown in FIG. 7, the machine equipped with conventional prior art blades stalled at 4115 psi insertion force. With the same 17.5 AWG main winding wire size and 0.070 inch blade gap, insertion proceeded smoothly and the maximum pressure only reached 2397 psi. With such significant insertion force reductions, the critical range of locking wire sizes is reduced, wire damage is lessened, and a general overall improvement of the coil insertion process is possible.

From the foregoing, it is now apparent that a novel blade for coil placing tooling along with a novel technique of configuring and operating such tooling has been disclosed meeting the objects and advantageous features set out hereinbefore as well as others. For example, the surface irregularities introduced on the blades where they contact the coils of wire have been disclosed as alternating grooves and lands as that is the presently preferred embodiment, however, other irregularities which reduce the area of contact, and therefore the friction, between the blades and wire will be readily apparent in sight of the forgoing disclosure. This and numerous other modifications as to the precise shapes, configurations and details may be made by those having ordinary skill in the art without departing from the spirit of the invention or the scope thereof as set out by the claims which follow.

What is claimed is:

1. In coil placing tooling for inserting prewound coils into slots of a dynamoelectric machine stator core, the coil placing tooling having a plurality of elongated generally parallel upstanding blades disposed in a generally cylindrical pattern for receiving prewound coils and a stator core, the improvement comprising an irregular blade surface in a region of contact between a blade and a corresponding prewound coil to reduce the area of contact between the blade and coil, and therefore also reduce the friction experienced by the coil during insertion into the core, the irregular blade surface comprising a fluted outer peripheral portion having a plurality of lands and a plurality of intervening grooves with the blade contacting a coil along at least two of the lands.

2. The apparatus of claim 1 wherein the lands and grooves are generally parallel to one another and to the direction of blade elongation.

3. In coil placing tooling for inserting prewound coils into slots of a dynamoelectric machine stator core, the coil placing tooling having a plurality of elongated generally parallel upstanding blades disposed in a generally cylindrical pattern for receiving prewound coils and a stator core, adjacent blades having opposed facing surfaces between which coil portions move during the insertion process, the improvement comprising a plurality of axially relieved generally parallel grooves along at least one of said opposed facing surfaces for reducing the frictional force between a coil portion and said at least one surface during coil insertion.

4. The improvement of claim 3 wherein the plurality of axially relieved regions comprise a plurality of grooves of generally uniform cross-sectional configuration extending in the direction of blade elongation, adjacent grooves defining therebetween a land for contacting the coil.

5. A method of inserting prewound coils into the slots of a stator core using coil insertion tooling having a plurality of elongated generally parallel upstanding blades disposed in a generally cylindrical pattern for receiving said prewound coils and the slotted stator core and for guiding the coils during insertion into selected stator core slots, the method reducing the frictional force between the blades and the prewound coils during insertion thereof and comprising the steps of providing the blade surfaces with a plurality of elongated grooves and a plurality of intervening coil contacting lands extending generally in the direction of blade elongation to thereby reduce both the area of contact between the coils and blade surfaces and the frictional force therebetween during insertion and then inserting said coils into said slots using said tooling.

6. An improved blade for coil placing tooling, the blade comprising an elongated member of generally uniform cross-sectional configuration including a generally convex portion and a plurality of intervening concave portions distributed about the convex portion comprising a plurality of grooves extending in the direction of blade elongation with adjacent grooves defining therebetween a land for contacting the coil, the blade being normally mounted in coil placing tooling with the concave portions providing free spaces along the convex portion between the areas of contact between the blade and a corresponding coil.

\* \* \* \* \*